(12) United States Patent
Amin (10) Patent No.: US 7,403,599 B2
(45) Date of Patent: Jul. 22, 2008

(54) INTERFACE FOR A MULTI-MESSAGING SYSTEM

(75) Inventor: Umesh Amin, King, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 620 days.

(21) Appl. No.: 10/364,421

(22) Filed: Feb. 12, 2003

(65) Prior Publication Data

US 2004/0156484 A1 Aug. 12, 2004

(51) Int. Cl.
H04M 11/00 (2006.01)
(52) U.S. Cl. ............... 379/88.14; 379/88.17; 379/88.18
(58) Field of Classification Search ............. 379/88.13, 379/88.14, 88.22, 88.17; 455/413
See application file for complete search history.

(56) References Cited

U.S. PATENT DOCUMENTS

| | | | |
|---|---|---|---|
| 6,418,306 B1 * | 7/2002 | McConnell ................. 455/413 |
| 6,434,222 B1 * | 8/2002 | Shaffer et al. ............ 379/88.13 |
| 6,459,776 B1 * | 10/2002 | Aktas et al. .............. 379/88.13 |
| 6,580,787 B1 * | 6/2003 | Akhteruzzaman et al. ....................... 379/88.14 |
| 6,640,230 B1 * | 10/2003 | Doss et al. .................... 707/10 |
| 7,133,901 B1 * | 11/2006 | Dalby et al. ................ 709/206 |
| 2002/0082030 A1 * | 6/2002 | Berndt et al. .............. 455/466 |
| 2002/0090069 A1 * | 7/2002 | Yaker ..................... 379/88.17 |

OTHER PUBLICATIONS

Network Computing, "Grand Unification: Voice, Data and Fax In One" updated Mar. 7, 1997.

* cited by examiner

*Primary Examiner*—Fan Tsang
*Assistant Examiner*—Simon Sing
(74) *Attorney, Agent, or Firm*—Kenyon & Kenyon LLP (57) ABSTRACT

Systems and methods of managing announcement messages provide for receiving a first announcement message, where the first announcement message is compatible with a first platform protocol of a first messaging server. The first announcement message is translated into a second announcement message, where the second announcement message is compatible with a second platform of a second messaging server. By enabling announcement messages such as voice mail greetings and email "out-of-office" messages to be created and updated with a single interface, more efficient messaging is achieved.

17 Claims, 6 Drawing Sheets

INTERFACE FOR A MULTI-MESSAGING SYSTEM

TECHNICAL FIELD

Embodiments of the present invention generally relate to messaging systems. More particularly, embodiments relate to the use of a common interface to update announcement messages across multiple messaging platforms.

BACKGROUND OF THE INVENTION

Messaging systems such as voice mail and email systems enable subscribers to send and receive messages, and are widely popular among consumers. Most of these systems provide the subscriber with the ability to store one or more announcement messages, where the announcement messages are used to notify others that the subscriber is unavailable. For example, a typical voice mail system gives a subscriber the opportunity to record a "greeting", where the greeting is reproduced for callers when the subscriber does not answer the phone after a predetermined number of rings. The greeting is typically stored on a voice mail server that corresponds to a platform having a particular protocol. The protocol can be designed for use in a wireless environment in which the called number is associated with a device such as a mobile station, or in a more traditional "wireline" environment in which the called number is associated with a fixed location. In another example, the messaging system could be an email messaging system in which the announcement message is an "out-of-office" message associated with an email protocol. Thus, the programmable out-of-office message enables a subscriber to notify senders of email as to the subscriber's schedule and/or availability.

While the ability to use a device such as a mobile phone or networked computer as an interface to program a customized announcement message into a given messaging system is highly desirable and commercially available, a number of difficulties remain. One difficulty concerns the fact that it is not uncommon for an individual subscriber to have multiple messaging accounts, where each account operates on a unique platform.

Under conventional approaches, the subscriber must update each messaging server individually whenever a change is desired. For example, when the subscriber travels out of town, the subscriber could need to manually access many different devices in order to update all of his or her messaging accounts accordingly. It has been determined that such an approach can be time consuming and inefficient. This is particularly true for subscribers that travel frequently. There is therefore a need for an approach to manage and update announcement messages across multiple messaging accounts that is efficient and less time consuming than requiring subscribers to use multiple interfaces.

While some approaches have been made at combining different types of servers onto a common platform in order to address these inefficiencies, the practical reality is that multiple platform environments will continue to exist. There is therefore also a need for an approach to manage and update announcement messages in a manner that accounts for the practical limitations of unified platforms.

SUMMARY OF THE INVENTION

Embodiments of the present invention include systems and methods of managing announcement messages that provide for receiving a first announcement message, where the first announcement message is compatible with a first platform protocol of a first messaging server. The first announcement message is translated into a second announcement message, where the second announcement is compatible with a second platform protocol of a second messaging server. The first announcement message can be translated into multiple announcement messages as appropriate. Translation of announcement messages therefore provides subscribers with the ability to update multiple messaging accounts via a single network interface.

Further embodiments of the present invention include methods and systems of updating announcement messages that provide for receiving a first announcement message from a user interface of a communication device, where the first announcement message is compatible with a first platform of a first messaging server. A translation message is sent toward a message translator, where the translation message is to instruct the message translator to translate the first announcement message into a second announcement message. The second announcement message is to be compatible with a second platform protocol of a second messaging server. In one embodiment, a mobile communication device such as a cell phone is used to send the translation message toward the message translator. The cell phone may be a code division multiple access (CDMA) phone, time division multiple access (TDMA) phone, global system for mobile communications (GSM) phone, etc. A laptop or personal digital assistant (PDA) may also be used to send the translation message toward the message translator.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Generally, embodiments of the present invention enable a user having a plurality of messaging devices and corresponding messaging accounts to update the announcement messages associated with each of the accounts via a single interface. For example, if the user (or subscriber) has a GSM phone, CDMA phone, work phone, home computer and work computer, one or more of these devices can be used to update the announcement messages associated with the other devices or systems. Updating announcement messages can involve translating the announcement messages across different platforms. By translating announcement messages across different platforms and mediums, embodiments of the present invention provide greater efficiency while taking into account the practical limitations of unified platforms.

Figure 1:
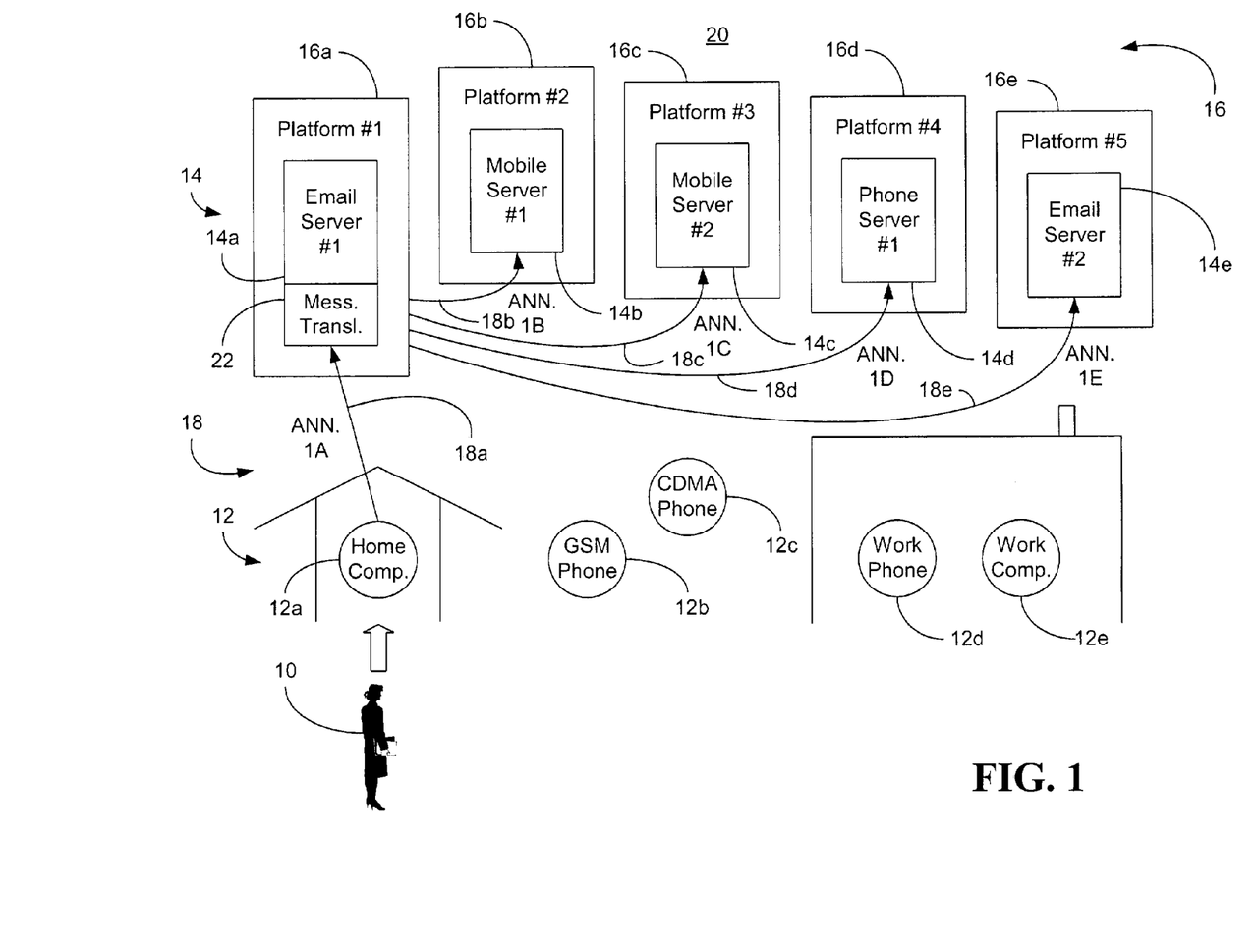
FIG. 1 is a diagram of an example of a messaging architecture according to one embodiment of the invention.

FIG. 1 shows an example of a messaging architecture 20 in which a subscriber 10 has a plurality of devices 12 (12a-12e), and each device 12 can function as an interface to a network and corresponding messaging server 14 (14a-14e) for storing and updating announcement messages (ANN. 1A-1E) 18 (18a-18e). Each messaging server 14 has a corresponding platform 16 (16a-16e), where each platform 16 has an associated platform protocol. Thus, an announcement message that is created in accordance with a particular platform protocol is typically incompatible with the protocols associated with the other platforms.

For example, the subscriber 10 may use home computer 12a to interface with an Internet protocol (IP) network (not shown) to store announcement message 18a to email server 14a on platform 16a, where announcement message 18a is generally incompatible with platforms 16b-16e. The same is typically true for announcement messages 18b-18e relative to the other messaging servers. In the illustrated approach, one of the servers 14 can be designated as the "primary" server, where the primary server functions to reduce the effort required on the part of the subscriber 10 in creating and/or updating messages.

Specifically, the primary server has a message translator 22, which translates announcement messages so that they are compatible with other platforms. The message translator 22 may be implemented in a single server component, across multiple components depending on the protocols involved, or each server may have its own message translator. Indeed, message translator 22 may be partitioned into dedicated servers for each of the other platforms 16b-16e.

In the illustrated example, email server 14a is designated as the primary server and includes a message translator 22, which receives a first announcement message 18a and translates the first announcement message 18a into announcement messages 18b-18e. As a result, the subscriber 10 only has to enter one announcement message. In the illustrated example, the subscriber 10 would merely access the out-of-office interface associated with the protocol for platform 16a, and type or record an announcement message such as "I will be on vacation from December 22 to January 3." This message would constitute the first announcement message 18a, which would be translated into the particular format required for each of the other platforms 16b-16e. For example, a text-to-speech (TTS) synthesizer could be used to translate the first announcement message 18a into a second announcement message 18b for mobile server 14b on platform 16b. In the case of a voicemail greeting being translated into an email out-of-office message, a speech-to-text recognizer could be used.

Information regarding the messaging accounts, and associated messaging servers 14 and platforms 16 can be stored in a subscriber profile, where each server 14 maintains a copy of the profile. As the subscriber 10 makes changes to the profile, all copies can be updated to ensure that the each server 14 has the most recent version. Changes to the profile may be made electronically or through voice commands.

Figure 2:
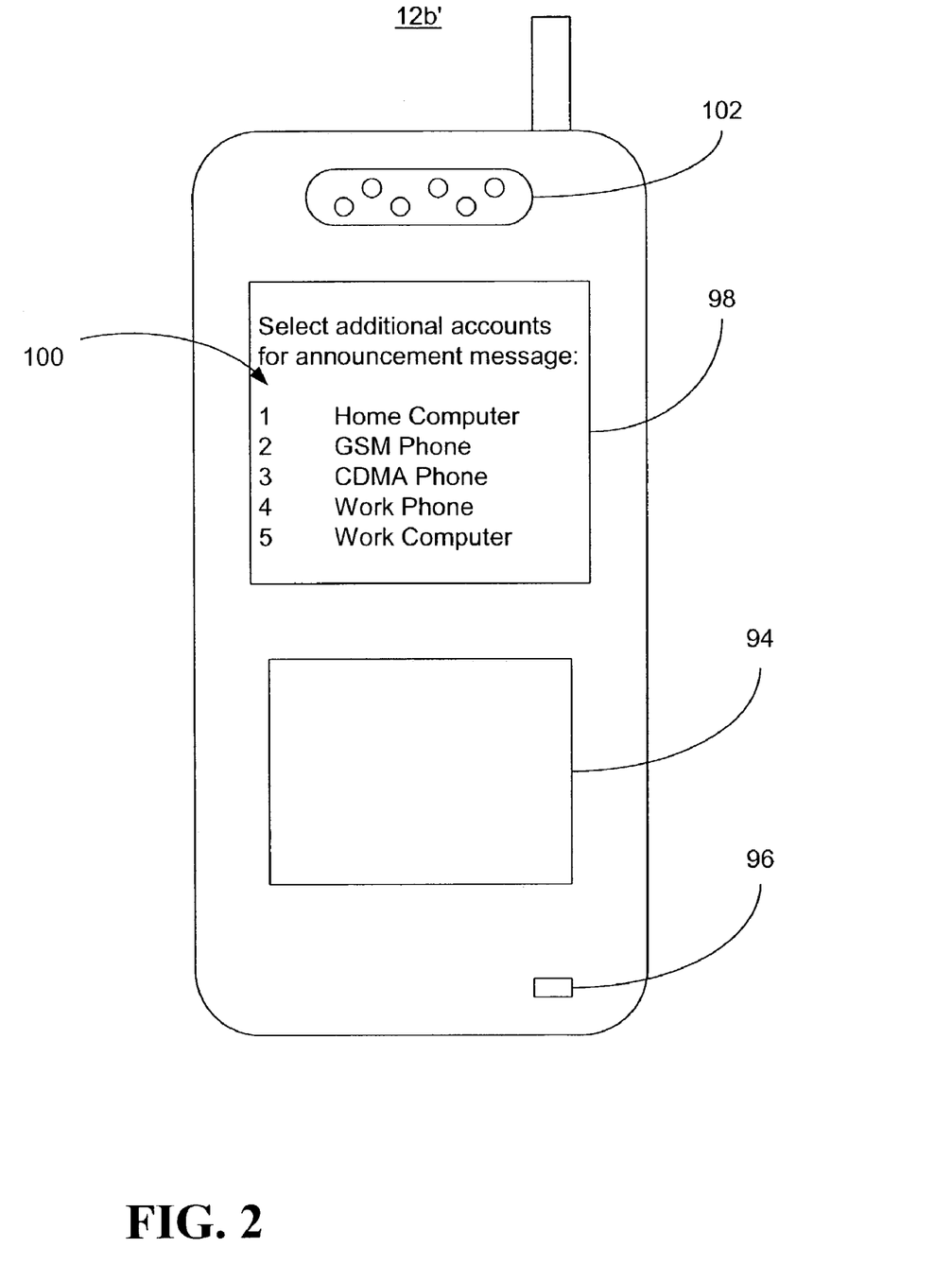
FIG. 2 is a diagram of an example of a mobile communication device according to one embodiment of the invention.

Although the primary server is illustrated in FIG. 1 as being an email server, which is accessed via a networked computer, any of the servers/devices may be used as the primary mechanism for updating announcement messages. For example, FIG. 2 illustrates that a mobile communication device such as Global System for Mobile Communications (GSM) phone 12b' can be used to update announcement messages. In one approach, the user can place a call to the appropriate messaging server using keypad 94 and/or voice-activated microphone 96. If the phone 12b' is of the personal digital assistant (PDA) type, the call may be placed by touching a stylus (not shown) to display 98. Once the call to the messaging server has been placed, the user can record an announcement message by speaking into microphone 96 and/or manipulating the keypad 94 in response to voice prompts emanating from speaker 102.

The phone 12b' can also be equipped with the ability to present a list 100 of messaging accounts to the user, where the messaging accounts correspond to other messaging servers. Upon receiving a user selection of one or more messaging accounts from the list 100, the phone 12b' can send a translation message toward a message translator/translation server, where the translation message instructs the message translator to translate the announcement message into additional announcement messages in accordance with the user selection and appropriate protocols. Although the example shown FIG. 2 incorporates the list 100 into the phone 12b', the list 100 may also be implemented as a series of voice or electronic prompts that are received from the message translator and relayed to the user via speaker 102.

Figure 3:
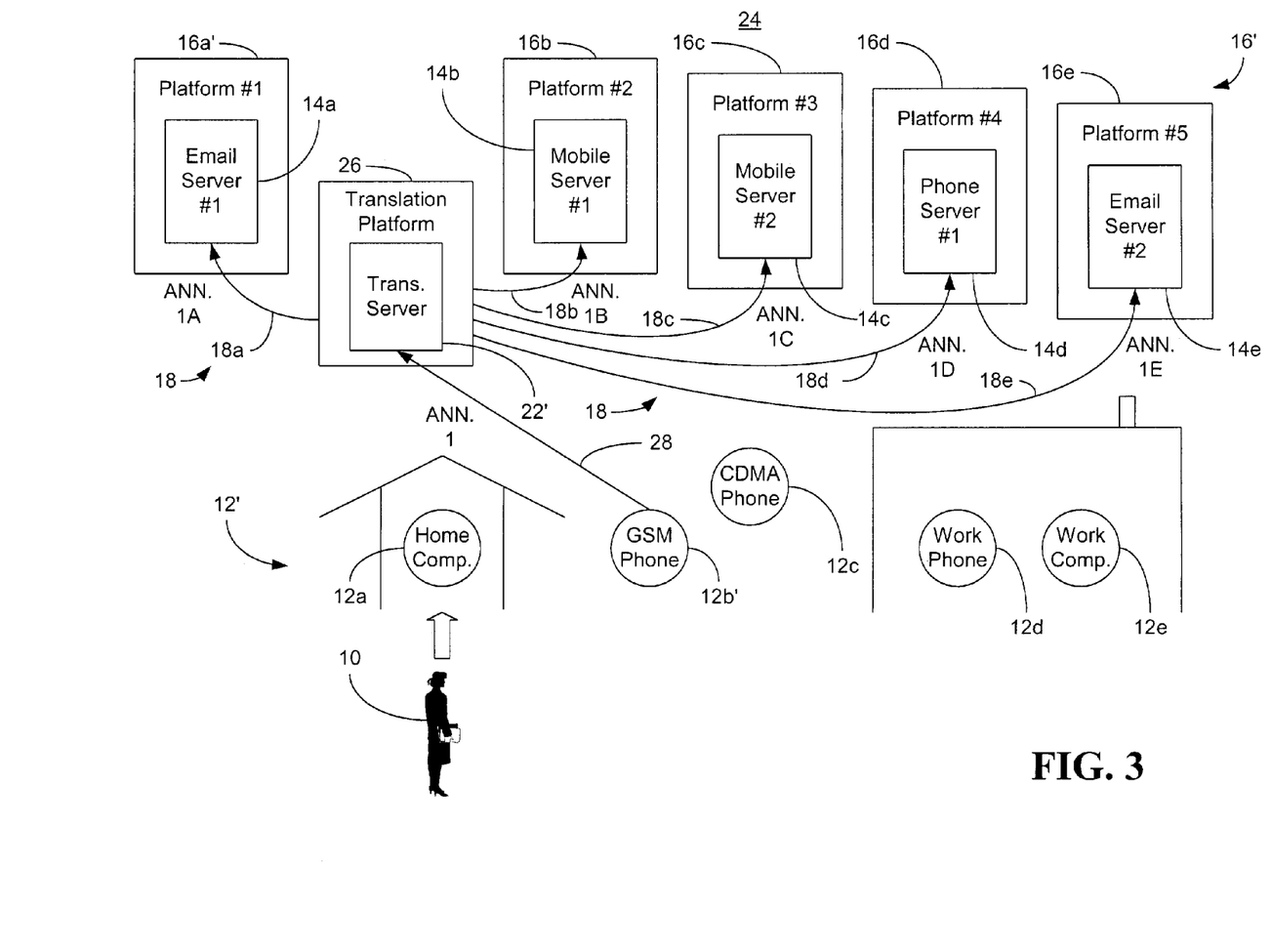
FIG. 3 is a diagram of an example of a messaging architecture according to a first alternative embodiment of the invention.

FIG. 3 shows an alternative architecture 24, where a dedicated translation platform 26 is associated with a translation server 22' that functions as a message translator. Platforms 16' include email platform platform 16a', and devices 12' include GSM phone 126'. In this example, subscriber 10 uses GSM phone 12b' to transmit an announcement message (ANN. 1) 28 to the translation server 22', where the announcement message 28 may be compatible with the protocol of the translation platform 26. Translation server 22' uses announcement message 28 to generate announcement messages 18. Thus, translation can be implemented through a stand-alone approach or by incorporating the translation functionality into one or more of the servers 14.

A typical scenario under which the above approaches would be deployed therefore involves, but is not limited to, 1) enabling the subscriber to use a device to access one of his or her messaging servers, 2) storing an announcement message at the server, 3) translating and forwarding the announcement message to the other messaging servers associated with the subscriber, 4) determining that a calling party has unsuccessfully attempted to reach the subscriber, 5) routing the calling party to one of the subscriber's messaging servers, and 6) reproducing the announcement message for the calling party.

Figure 4:
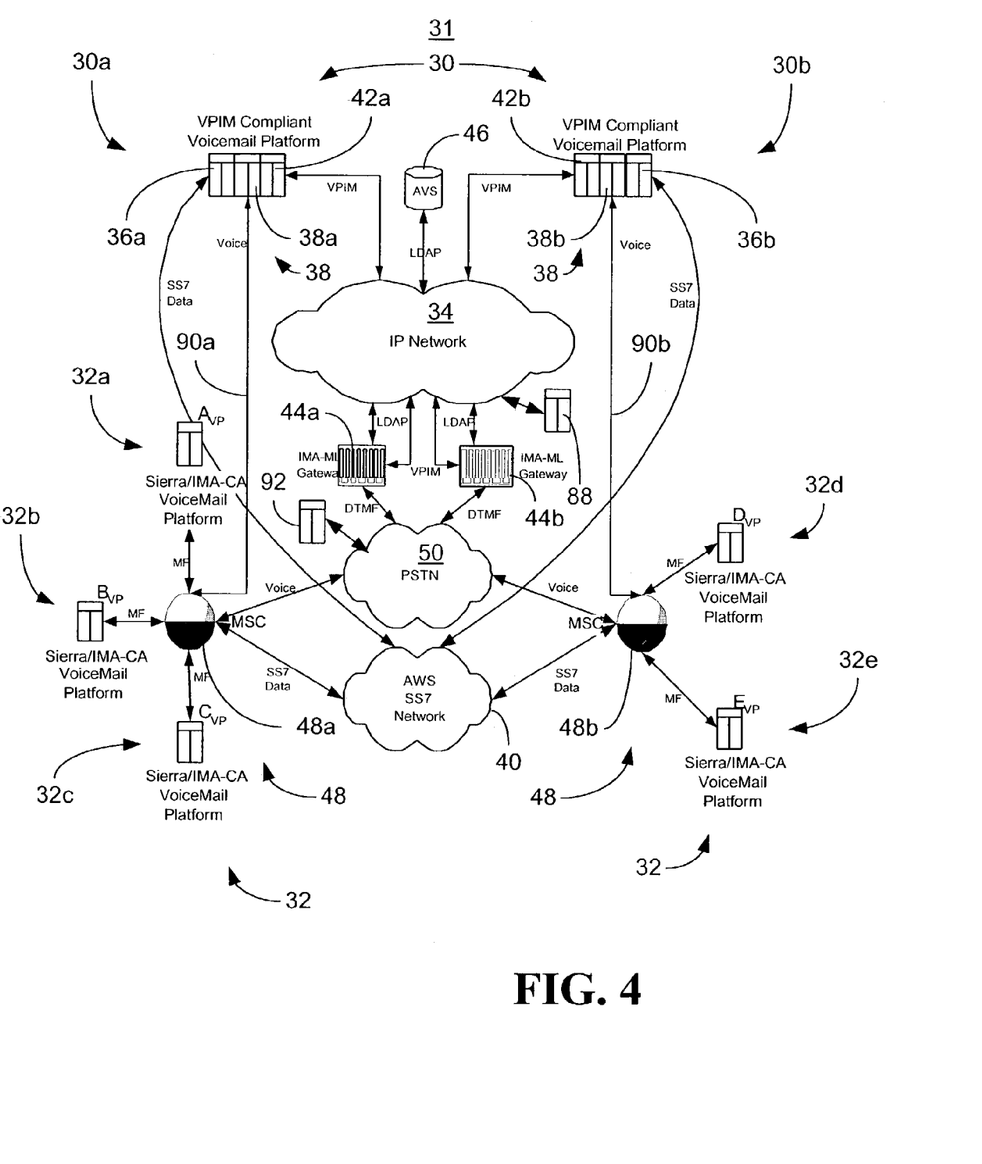
FIG. 4 is a diagram of an example of a messaging architecture according to a second alternative embodiment of the invention.

Turning now to FIG. 4, a more specific example of updating announcement messages between different platforms is shown in architecture 31. In the illustrated example, wireless voice mail platforms 30 (30a, 30b) are able to translate announcement messages into a format that is compatible with other wireless voice mail platforms 32 (32a-32d), platforms corresponding to wireline system servers such as server 92, and platforms corresponding to email-servers such as server 88 connected to Internet protocol (IP) network 34. Architecture 31 will be described for the example in which a subscriber has a home service area associated with mobile switching center (MSC) 48b and maintains messaging accounts with voice mail platforms 30b and 32d, wireline system server 92, and email server 88 to facilitate discussion. Platforms 30 have voice data servers 38 (38a, 38b), where voice data server 38a has a dedicated voice connection 90a with MSC 48a and voice data server 38b has a dedicated voice connection 90b with MSC 48b. Voice connections 90a, 90b enable the transfer of voice data between platforms 30 and MSCs 48 (48a, 48b). The voice data transferred over voice connections 90a, 90b includes data associated with the announcement messages, which can be customized by the subscriber.

For example, the subscriber can use a mobile station to dial into MSC 48a, where MSC 48a communicates over signaling system 7 (SS7) network 40 and public switched telephone network (PSTN) 50 to connect the call to platform 30b. Specifically, the SS7 data is routed to an SS7 server 36b where each platform 30 has an SS7 server 36 (36a, 36b). Thus, the SS7 servers 36 facilitate the transfer of voice data between voice data servers 38 and MSC 48. The voice data is routed to MSC 48b and over voice connection 90b to voice data server 38b.

Once the subscriber is connected to platform 30b, the subscriber may store announcement messages, or greetings, to voice data server 38b in accordance with the protocol associated with platform 30b. Voice data server 38b is able to forward the announcement message to platform 32d, where the forwarded announcement message is compatible with the protocol associated with platform 32d. The announcement message can also be forwarded over PSTN 50 to wireline system server 92, where the forwarded announcement message is compatible with the protocol associated with the platform that corresponds to wireline system server 92. In the illustrated example, platforms 32 are inverse multiplexing over ATM-caller applications (IMA-CA) platforms commercially available from Lucent Technologies, Messaging Solutions Division, Murray Hill, N.J.

Voice data server 38b also uses voice profile for Internet mail (VPIMv2, Internet Engineering Task Force/IETF) server 42b to forward the announcement message over Internet protocol (IP) network 34 to email server 88, where each platform 30 has a VPIM server 42 (42a, 42b). The forwarded announcement message can therefore be a text version of the announcement message that is formatted to be compatible with the platform associated with email server 88.

Any of the other servers may also function as the primary server for the subscriber's messaging accounts. For example, if the announcement message is being translated from the protocol associated with platforms 32, IMA-messaging link (IMA-ML) gateways 44 (44a, 44b) are used to interface with IP network 34. An address validation server (AVS) uses the lightweight directory access protocol (LDAPv3, IETF) to map VPIM domains to IP addresses on the IP network 34. The PSTN 50 uses dual-tone multiple-frequency (DTMF) signaling to communicate with IMA-ML Gateways 44 and the IMA-ML gateways 44 use LDAP and VPIM to translate the announcement message into an IP compatible format.

The translated announcement messages can therefore be used to notify calling parties as to the unavailability and/or schedule of the subscriber. A call intended for the subscriber can come into the network from any point and will be routed to the appropriate server. For example, if a calling party calls into MSC 48b in an unsuccessful attempt to reach the subscriber on the device associated with the messaging account for platform 30b (e.g., GSM mobile station), the calling party can be routed to platform 30b using SS7 network 40 and dedicated voice connection 90b. In such a case, the voice data server 38b reproduces the announcement message previously stored on voice data server 38b for the calling party.

If the calling party attempts to reach the subscriber on the device associated with the messaging account for platform 32d (e.g., CDMA mobile station), the translated announcement message stored on platform 32d is reproduced over a multi-frequency (MF) link between MSC 48b and platform 32d, where creation of the translated message required no additional effort on the part of the subscriber.

Figure 5:
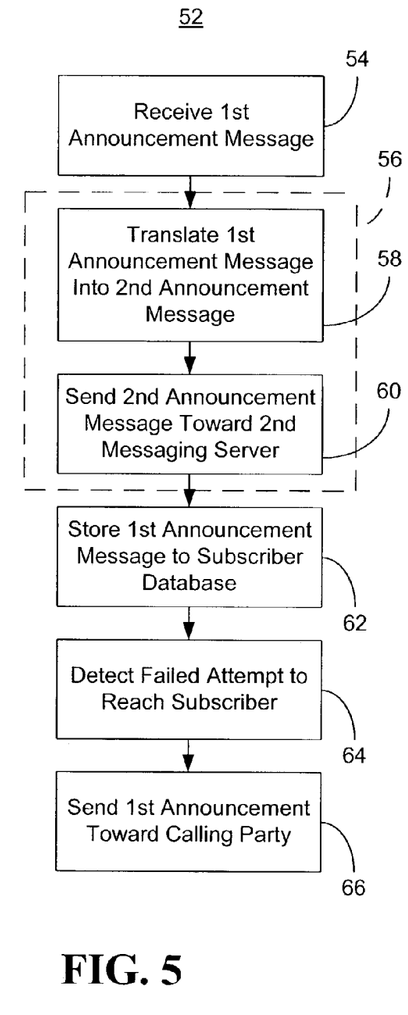
FIG. 5 is a flowchart of an example of a method of managing announcement messages according to one embodiment of the invention.

Turning now to FIG. 5, a method 52 of managing announcement messages is shown. Method 52 can be implemented in a message translator or translator server as a set of instructions capable of being executed by a processor to achieve announcement message storage, translation and forwarding. As already discussed, the instructions can be executed in a single message translation component or distributed across multiple message translation components. The instructions can be written using any number of well-known software programming techniques and can be stored in a wide variety of machine-readable media such as electrically erasable programmable read only memory (EEPROM), compact disk ROM (CD-ROM), dynamic random access memory (DRAM), etc.

Generally, a first announcement message is received at processing block 54, where the first announcement message is compatible with a first platform protocol of a first messaging server. A translated version of the first announcement message is forwarded at block 56 to a second messaging server, where block 58 provides for translating the first announcement message into a second announcement message, and block 60 provides for sending the second announcement message toward the second messaging server. The second announcement message is compatible with a second platform protocol, so that updating of announcement messages can be achieved via a single subscriber interface. The first announcement message is translated into as many additional different protocols as required.

One or more conditional announcement messages may be created in addition to the first announcement message, where the conditional announcement messages enable the subscriber to define different calling conditions and achieve enhanced customization. For example, a conditional announcement message might be created in a different language for callers from foreign countries. If so, the calling conditions could include area codes, etc., from countries having an official language that matches the language of the conditional announcement message. If the system is equipped with foreign language translation functionality, such a conditional announcement message could be created internally. Alternatively, the subscriber could perform the foreign language translation. In any event, translated versions of the conditional announcement messages can be forwarded toward the additional messaging servers.

As already discussed, the first, or conditional, announcement message can be an out-of-office message associated with an email protocol and the second announcement message can be a greeting associated with a voice mail protocol. Alternatively, the first message can be a greeting associated with a voice mail protocol and the second announcement message can be out-of-office message associated with an email protocol. In either case, the VPIM protocol described above may be used to implement translation. In yet another example, both announcement messages can be associated with different voice mail protocols, or different email protocols. The voice mail protocols can be wireless voice mail protocols in which the called number is associated with a device such as a mobile station, or wireline voice mail protocols in which the called number is associated with a relatively fixed location.

In any event, block 62 provides for associating the first announcement message with a profile of the subscriber by storing the first announcement message to a subscriber database associated with the first messaging server. A failed, or otherwise unsuccessful, attempt by a calling party to reach the subscriber is detected at block 64, and block 66 provides for sending the first announcement message toward the calling party in response to detecting the failed attempt. The detection can be associated, for example, with the receipt of an email when an out-of-office email rule is active or determining that a call placed to the subscriber's communication device has gone unanswered for a predetermined number of rings. Sending the first announcement message at block 66 may therefore involve replaying a recorded message or forwarding a pre-typed email.

Figure 6:
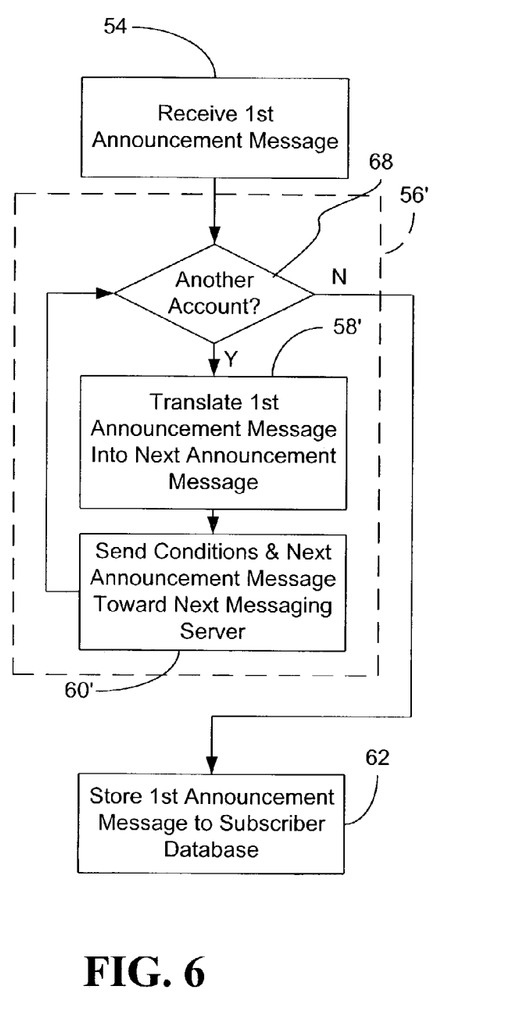
FIG. 6 is a flowchart of an example of a process of updating a second messaging server according to one embodiment of the invention.

FIG. 6 shows an alternative approach to forwarding the first announcement message to other messaging servers at block 56'. The illustrated example essentially takes into account the possibility that more than two messaging accounts exist. Thus, block 68 provides for determining whether another messaging account is associated with the subscriber in question. This determination can be made by accessing a subscriber profile associated with the primary server, or by accessing an appropriate database. The first announcement message is translated into the announcement message associated with the next messaging account at block 58', where block 60' provides for sending the next announcement message toward the next messaging server and the next messaging account has a different protocol. The process is repeated until all messaging servers have been updated. It should be noted that the forwarded announcement message may also include the conditions under which the announcement message is to be reproduced for, or sent to, calling parties. Announcement conditions are discussed in greater detail below.

Figure 7:
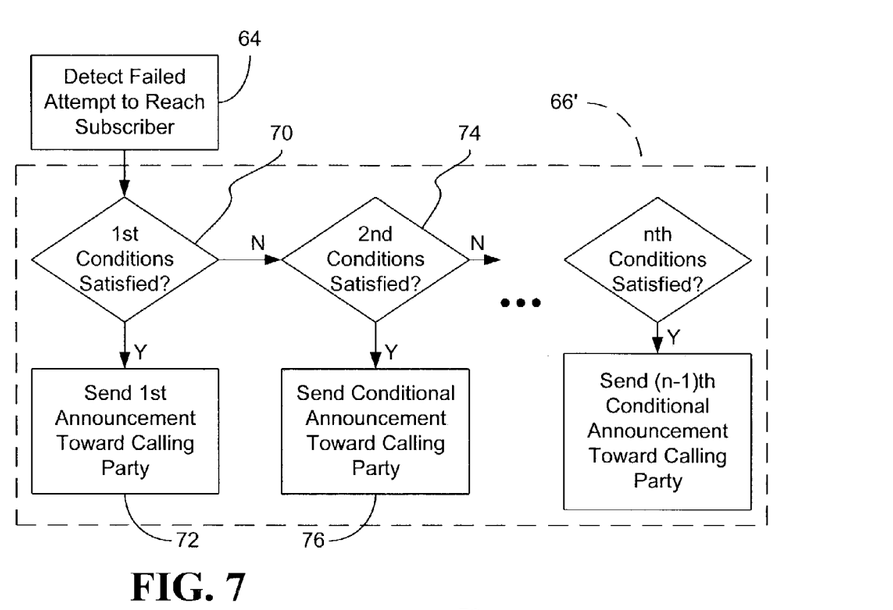
FIG. 7 is a flowchart to of an example of a process of sending an announcement message toward a calling party according to one embodiment of the invention.

Turning now to FIG. 7, one approach to sending announcement messages toward calling parties is shown in greater detail at block 66'. In the illustrated example, multiple announcement messages have been created to account for different calling conditions in order to provide the subscriber with enhanced customization. For example, one conditional announcement message might be created for cases in which the calling party is unknown to the subscriber. In such cases, the subscriber may simply wish to indicate that he or she is absent (e.g., "I will be on vacation from December 22 to January 3"). A conditional announcement message may also be created, however, for calling parties that are known to the subscriber, or are included in a list of "preferred" callers. In such a case, the subscriber may wish to provide the calling party with a contact number (e.g., "I will be on vacation from December 22 to January 23. During this period you may reach me at 555-1234.").

A unique set of announcement conditions can therefore be associated with each announcement message, where satisfaction of the announcement conditions results in selection of the corresponding announcement message. Specifically, block 70 provides for determining whether a first set of announcement conditions is satisfied, where the first set of announcement conditions define circumstances under which the first announcement message is to be sent toward the calling party. The first announcement message is sent toward the calling party at block 72 if the first set of announcement conditions is satisfied. Similarly, block 74 provides for determining whether a second set of announcement conditions is satisfied, where the second set of announcement conditions define conditional circumstances under which a conditional announcement is to be sent toward a calling party. If so, the conditional announcement message is sent toward the calling party at block 76. It should be noted that the conditions as well as the associated conditional announcement can be forwarded to additional platforms as already discussed. Furthermore, the conditions may be based on information that can be extracted from the voice mail call record or email header. For example, well-established caller ID techniques enable extraction of calling party identifiers from call records.

Figure 8:
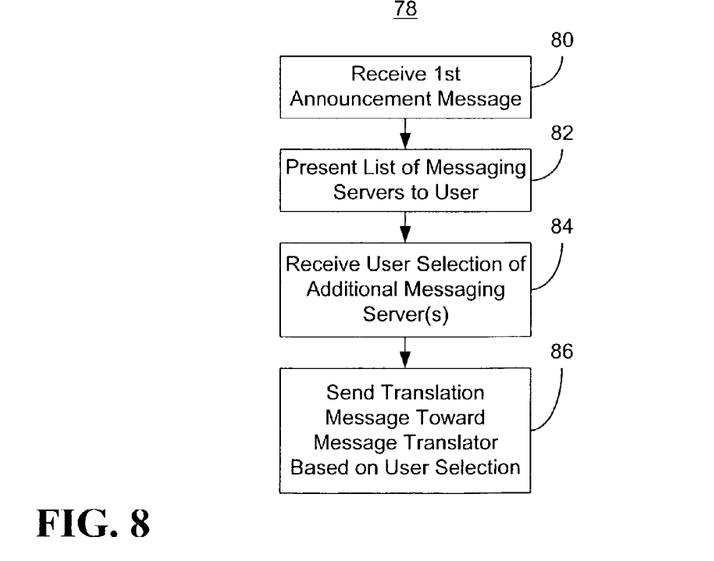
FIG. 8 is a flowchart of an example of a method of updating announcement messages according to one embodiment of the invention.

Turning now to FIG. 8, a method 78 of updating announcement messages is shown. Method 78 can be implemented in a handset such as GSM phone 12b' (FIG. 2) or other mobile communication device as a set of instructions capable of being executed by a processor to create and update announcement messages. Generally, block 80 provides for receiving a first announcement message, where the first announcement message is compatible with a first platform of a first messaging server. Typically, the handset has a microphone, key pad, or other input device capable of receiving the first announcement message. Block 82 provides for presenting a list of messaging servers to a user, and block 84 provides for receiving a user selection of one or more additional messaging servers from the list. A translation message is sent toward a message translator at block 86, where the translation message is to instruct the message translator to translate the first announcement message into one or more additional announcement messages. The translation message can merely be the additional server selection, which in and of itself represents an instruction to translate, or can be a command. It should also be noted that translation can be automatically performed by the primary server upon receipt of an announcement message so that translation is transparent to the handset. In any event, the additional announcement messages are to be compatible with the platform protocols of their respective second messaging servers.

Thus, messaging system subscribers can update all announcement messages from a single interface, whether it be a home computer, a mobile phone, a wireline phone, or a work computer. As a result, subscribers that travel frequently or have complicated schedules can readily keep others notified to their whereabouts.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method of managing announcement messages, comprising:

responsive to an announcement message received from a user, storing the announcement message at a first messaging server in a format associated therewith, wherein said announcement is an out-of-office message or a greeting;

responsive to a selection, also received from the user, from among a list of messaging services presented to the user, converting the format of the announcement message into an additional messaging format associated with the selected messaging service; and storing the announcement message at another messaging server associated with the selected messaging service in the additional messaging format.

2. The method of claim 1, wherein the announcement message is an out-of-office message associated with an email format and the additional messaging format is a voice mail format.

3. The method of claim 2, wherein the voice mail format is a wireless voice mail format.

4. The method of claim 1, wherein the announcement message is a greeting associated with a voice mail format and the additional messaging format is an email format.

5. The method of claim 2, wherein the voice mail format is a wireline voice mail format.

6. The method of claim 1, further including:
associating the announcement message with a profile of a subscriber;
detecting a failed attempt by a calling party to reach the subscriber; and
sending the announcement message toward the calling party in response to detecting the failed attempt.

7. The method of claim 6, further including storing the announcement message to a subscriber database associated with the first messaging server.

8. The method of claim 1 further including:
receiving a set of announcement conditions corresponding to the announcement message, the set of announcement conditions defining circumstances under which the announcement message is to be sent toward a calling party; and
sending the announcement message toward the calling party if the set of announcement conditions is satisfied.

9. The method of claim 6, further including:
responsive to a conditional announcement message received from the user, storing the conditional announcement message at the first messaging server in a format associated therewith;
responsive to a user selection from among a list of messaging services presented to the user, converting the format of the conditional announcement message into the additional messaging format associated with the selected messaging service; and
storing the conditional announcement message at another messaging server associated with the selected messaging service in the additional messaging format.

10. The method of claim 9, further including:
receiving a set of announcement conditions corresponding to the conditional announcement message, the set of announcement conditions defining conditional circumstances under which the conditional announcement is to be sent toward the calling party; and
sending the conditional announcement message toward the calling party if the set of announcement conditions is satisfied.

11. A method of managing announcement messages, comprising:
responsive to an announcement message received from a user via a communications device, storing the announcement message at a first messaging server in a format associated therewith, wherein said announcement is an out-of-office message or a greeting;
responsive to a selection, also received from the user, from among a list of messaging services presented to the user, converting the format of the announcement message into an additional messaging format associated with the selected messaging service; and
storing the announcement message at another messaging server associated with the selected messaging service in the additional messaging format.

12. A machine readable medium comprising a stored set of instructions capable of being executed by a processor to:
responsive to an announcement message received from a user, storing the announcement message at a first messaging server in a format associated therewith, wherein said announcement is an out-of-office message or a greeting;
responsive to a selection, also received from the user, from among a list of messaging services presented to the user, converting the format of the announcement message into an additional messaging format associated with the selected messaging service; and
storing the announcement message at another messaging server associated with the selected messaging service in the additional messaging format.

13. The medium of claim 12, wherein the announcement message is an out-of-office message associated with an email format and the additional messaging format is a voice mail format.

14. The medium of claim 12, wherein the announcement message is a greeting associated with a voice mail format and the additional messaging format is an email format.

15. The medium of claim 12, wherein the instructions are further capable of being executed to:
associate the announcement message with a profile of a subscriber;
detect a failed attempt by a calling party to reach the subscriber; and
send the announcement message toward the calling party in response to detection of the failed attempt.

16. A mobile communication device having a computer program embodied in a computer readable medium for causing a processor to carry out steps of the computer program, comprising:
responsive to an announcement message received from a user, storing the announcement message at a first messaging server in a format associated therewith, wherein said announcement is an out-of-office message or a greeting;
responsive to a selection, also received from the user, from among a list of messaging services presented to the user, converting the format of the announcement message into an additional messaging format associated with the selected messaging service; and
storing the announcement message at another messaging server associated with the selected messaging service in the additional messaging format.

17. The communication device of claim 16, wherein the additional messaging format is an email format.

* * * * *